(12) United States Patent
Sadagopan et al.

(10) Patent No.: US 12,340,270 B1
(45) Date of Patent: Jun. 24, 2025

(54) MANAGING DISTRIBUTED DEVICES USING UNIQUE CODES

(71) Applicant: International Business Machines Corporation, Armonk, NY (US)

(72) Inventors: Satishkumar Sadagopan, Leawood, KS (US); Dinesh C. Verma, New Castle, NY (US); Gerald Coon, Durham, NC (US); Mathews Thomas, Flower Mound, TX (US); Utpal Mangla, Toronto (CA); Pawan Raghunath Chowdhary, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/640,996

(22) Filed: Apr. 19, 2024

(51) Int. Cl.
*G06K 7/14* (2006.01)
*G06K 7/10* (2006.01)
*G06K 19/06* (2006.01)

(52) U.S. Cl.
CPC ....... *G06K 7/1413* (2013.01); *G06K 7/10881* (2013.01); *G06K 19/06028* (2013.01); *G06K 2007/10524* (2013.01)

(58) Field of Classification Search
CPC .... G06K 7/1413; G06K 7/10881; G06K 7/14; G06K 7/109; G06K 19/06028
USPC .................. 235/462.45, 472.01, 462.1, 375
See application file for complete search history.

(56) References Cited

U.S. PATENT DOCUMENTS

| | | | |
|---|---|---|---|
| 9,463,574 B2 | 10/2016 | Purkayastha et al. | |
| 10,474,858 B2 | 11/2019 | Davis et al. | |
| 10,565,548 B2 | 2/2020 | Skaff et al. | |
| 10,805,217 B2 | 10/2020 | Kodaypak et al. | |
| 11,297,512 B2 | 4/2022 | Benson et al. | |
| 12,277,409 B1* | 4/2025 | Leeman-Munk | G06F 8/35 |
| 2017/0255899 A1 | 9/2017 | Taira et al. | |
| 2018/0005173 A1 | 1/2018 | Elazary et al. | |

FOREIGN PATENT DOCUMENTS

WO 2013071150 A1 5/2013

OTHER PUBLICATIONS

Telecordia, "Common Language Location Codes (CLLI Codes) Description for Location Identification," Telcordia Technologies Practice, Issue 28, May 2010, 172 pages.

(Continued)

*Primary Examiner* — Edwyn Labaze
(74) *Attorney, Agent, or Firm* — Zilka-Kotab, P.C.

(57) ABSTRACT

A computer-implemented method, according to one approach, includes: receiving, from a remote location, a request to generate a unique equipment code identifying a device. Identifying characteristics of the device are determined, and a unique equipment code is generated. The unique equipment code is generated by applying policy based rules summarized in one or more predetermined information dependency graphs while combining at least some of the determined identifying characteristics in a specific order. Moreover, the combined identifying characteristics are converted into a corresponding alphanumeric string. The unique equipment code is assigned to the device and the unique equipment code is also transmitted to the remote location.

20 Claims, 6 Drawing Sheets

(56) References Cited

OTHER PUBLICATIONS

Tarau et al., "Dependency-based Text Graphs for Keyphrase and Summary Extraction with Applications to Interactive Content Retrieval," arXiv, 2019, 10 pages, retrieved from https://arxiv.org/abs/1909.09742.

Iconectiv, "TruOps Common Language Location Information Services CLLI," iconectiv, 2021, 6 pages.

Anonymous, "A Multi-Language Software Dependency Analysis and Visualization Tool," IP.com Prior Art Database Technical Disclosure No. IPCOM000271483D, Dec. 20, 2022, 4 pages.

Anonymous, "System and Method to Auto Detect Dependency between Jobs," IP.com Prior Art Database Technical Disclosure No. IPCOM000268310D, Jan. 23, 2022, 9 pages.

Ehrenreich, R., "System and Method for Automatically Generating Platform-Specific Database Code from Schema composed of Typed Tables and Formulas," IP.com Prior Art Database Technical Disclosure No. IPCOM000255833D, Oct. 16, 2018, 44 pages.

\* cited by examiner

MANAGING DISTRIBUTED DEVICES USING UNIQUE CODES

BACKGROUND

The present invention relates to device monitoring, and more specifically, this invention relates to automatically generating unique equipment codes.

Systems have become increasingly complex over time, particularly with the rapid development of Internet of Things (IoT) devices in combination with artificial intelligence (AI) based models. The rise of smart enterprise endpoints has also led to large amounts of data being generated at remote locations. System complexity and distribution will only further increase with the growth of 5G networks and an increased number of connected network based devices.

As the number of devices continues to rise, it becomes increasingly important to be able to distinguish between them. This is particularly true in situations where performance is dictated by ease of access as well as large systems having a multitude of distributed devices. While attempts have been made to manage devices that are widely spread, they have been unsuccessful in doing so. As a result, conventional products have resorted to using inaccurate device information, leading to slow access times and a poor understanding of the devices themselves.

SUMMARY

A computer-implemented method (CIM), according to one approach, includes: receiving, from a remote location, a request to generate a unique equipment code identifying a device. Identifying characteristics of the device are determined, and a unique equipment code is generated. The unique equipment code is generated by applying policy based rules summarized in one or more predetermined information dependency graphs while combining at least some of the determined identifying characteristics in a specific order. Moreover, the combined identifying characteristics are converted into a corresponding alphanumeric string. The unique equipment code is assigned to the device and the unique equipment code is also transmitted to the remote location.

A computer program product (CPP), according to another approach, includes: a set of one or more computer-readable storage media. The CPP also includes program instructions that are collectively stored in the set of one or more storage media, and are for causing a processor set to perform the foregoing CIM.

A computer system (CS), according to yet another approach, includes: a processor set, and a set of one or more computer-readable storage media. The CS also includes program instructions that are collectively stored in the set of one or more storage media, and are for causing the processor set to perform the foregoing CIM.

Other aspects and implementations of the present invention will become apparent from the following detailed description, which, when taken in conjunction with the drawings, illustrate by way of example the principles of the invention.

DETAILED DESCRIPTION

Figure 1:
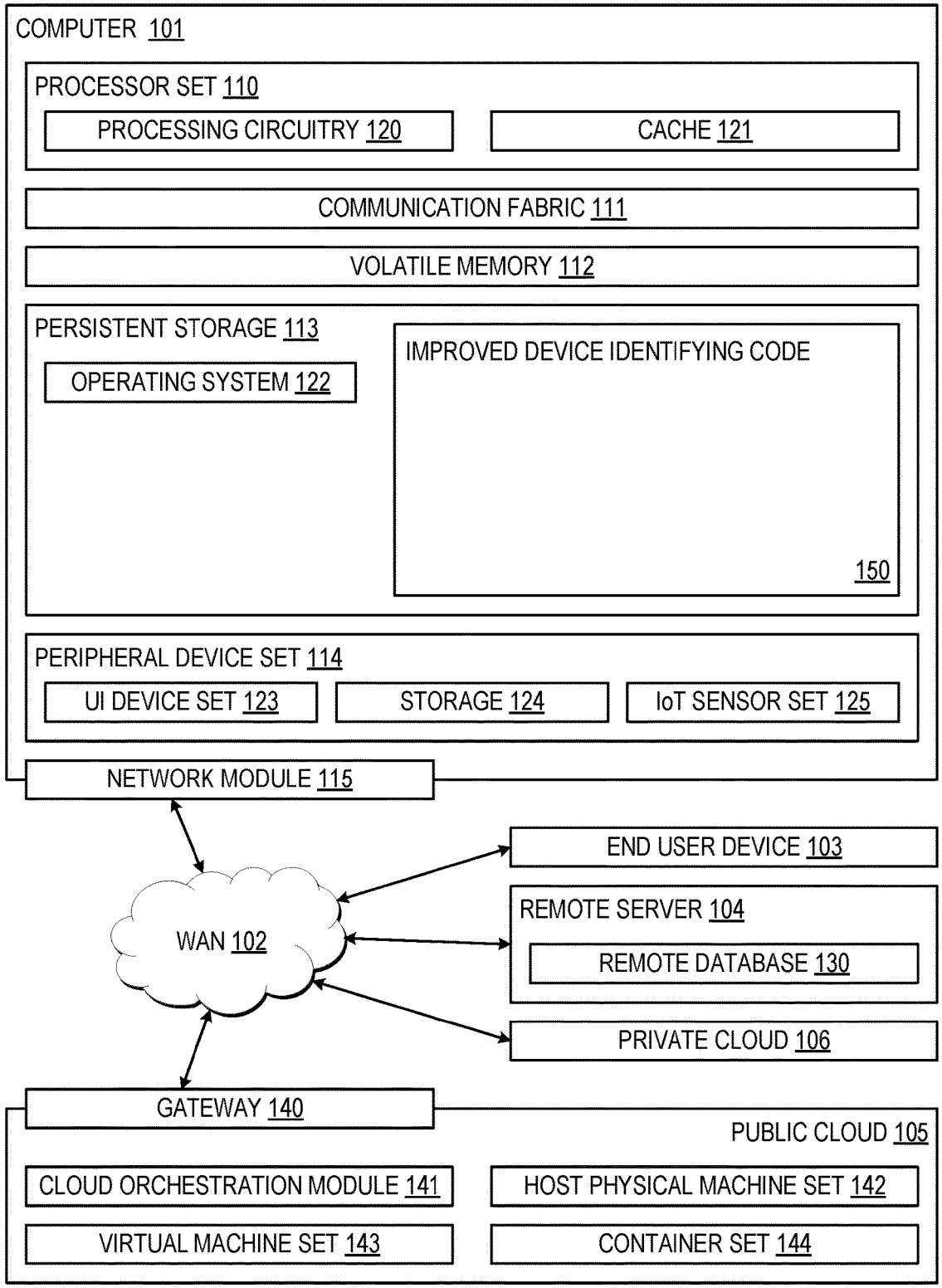
FIG. 1 is a diagram of a computing environment, in accordance with one approach.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred approaches of systems, methods and computer program products for generating unique equipment codes for devices distributed across various locations. As a result, implementations herein are desirably able to track identifying characteristics of different devices, and use those identifying characteristics to generate and maintain an updated set of unique equipment codes. This further desirably reduces the amount of time associated with accessing components and various information associated therewith, e.g., as will be described in further detail below.

In one general approach, a CIM includes: receiving, from a remote location, a request to generate a unique equipment code identifying a device. Identifying characteristics of the device are determined, and a unique equipment code is generated. The unique equipment code is generated by applying policy based rules summarized in one or more predetermined information dependency graphs while combining at least some of the determined identifying characteristics in a specific order. Moreover, the combined identifying characteristics are converted into a corresponding alphanumeric string. The unique equipment code is assigned to the device and the unique equipment code is also transmitted to the remote location.

In another general approach, a CPP includes: a set of one or more computer-readable storage media. The CPP also includes program instructions that are collectively stored in the set of one or more storage media, and are for causing a processor set to perform the foregoing CIM.

In yet another general approach, a CS includes: a processor set, and a set of one or more computer-readable storage media. The CS also includes program instructions that are collectively stored in the set of one or more storage media, and are for causing the processor set to perform the foregoing CIM.

Various aspects of the present disclosure are described by narrative text, flowcharts, block diagrams of computer systems and/or block diagrams of the machine logic included in CPP embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as improved device identifying code at block 150 for generating unique equipment codes for devices distributed across various locations. As a result, implementations herein are desirably able to track identifying characteristics of different devices, and use those identifying characteristics to generate and maintain an updated set of unique equipment codes, e.g., as will be described in further detail below.

In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and IoT sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments.

Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

CLOUD COMPUTING SERVICES AND/OR MICROSERVICES (not separately shown in FIG. 1): private and public clouds 106 are programmed and configured to deliver cloud computing services and/or microservices (unless otherwise indicated, the word "microservices" shall be interpreted as inclusive of larger "services" regardless of size). Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of APIs. One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

In some aspects, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

Of course, this logic may be implemented as a method on any device and/or system or as a computer program product, according to various approaches.

As noted above, systems have become increasingly complex over time, particularly with the rapid development of IoT devices in combination with artificial intelligence based models. The rise of smart enterprise endpoints has also led to large amounts of data being generated at remote locations. System complexity and distribution will only further increase with the growth of 5G networks and an increased number of connected network based devices.

As the number of network based devices continues to rise, it becomes increasingly important to be able to distinguish between them. This is particularly true in situations where performance is dictated by ease of access as well as large systems having a multitude of distributed devices. While attempts have been made to manage devices that are widely spread, they have been unsuccessful in doing so. As a result, conventional products have resorted to using inaccurate device information, leading to slow access times and a poor understanding of the devices themselves.

In sharp contrast, approaches herein are desirably able to maintain an accurate understanding of various components by orchestrating an intelligent process of generating and managing unique equipment codes across distributed systems. Approaches herein are able to achieve these improvements by generating unique equipment codes that are configured to track identifying characteristics of different (network based) devices such that they may be more easily and closely tracked. The relationships between the various devices may also be managed using dependency graphs that can be accessed while generating new equipment codes and/or reviewing existing equipment codes to identify changes over time. Characteristics including the type of device, the physical location of a device, an intended logical use within a higher level development process, etc., may also be indicated, thereby further improving accessibility, e.g., as will be described in further detail below.

Figure 2:
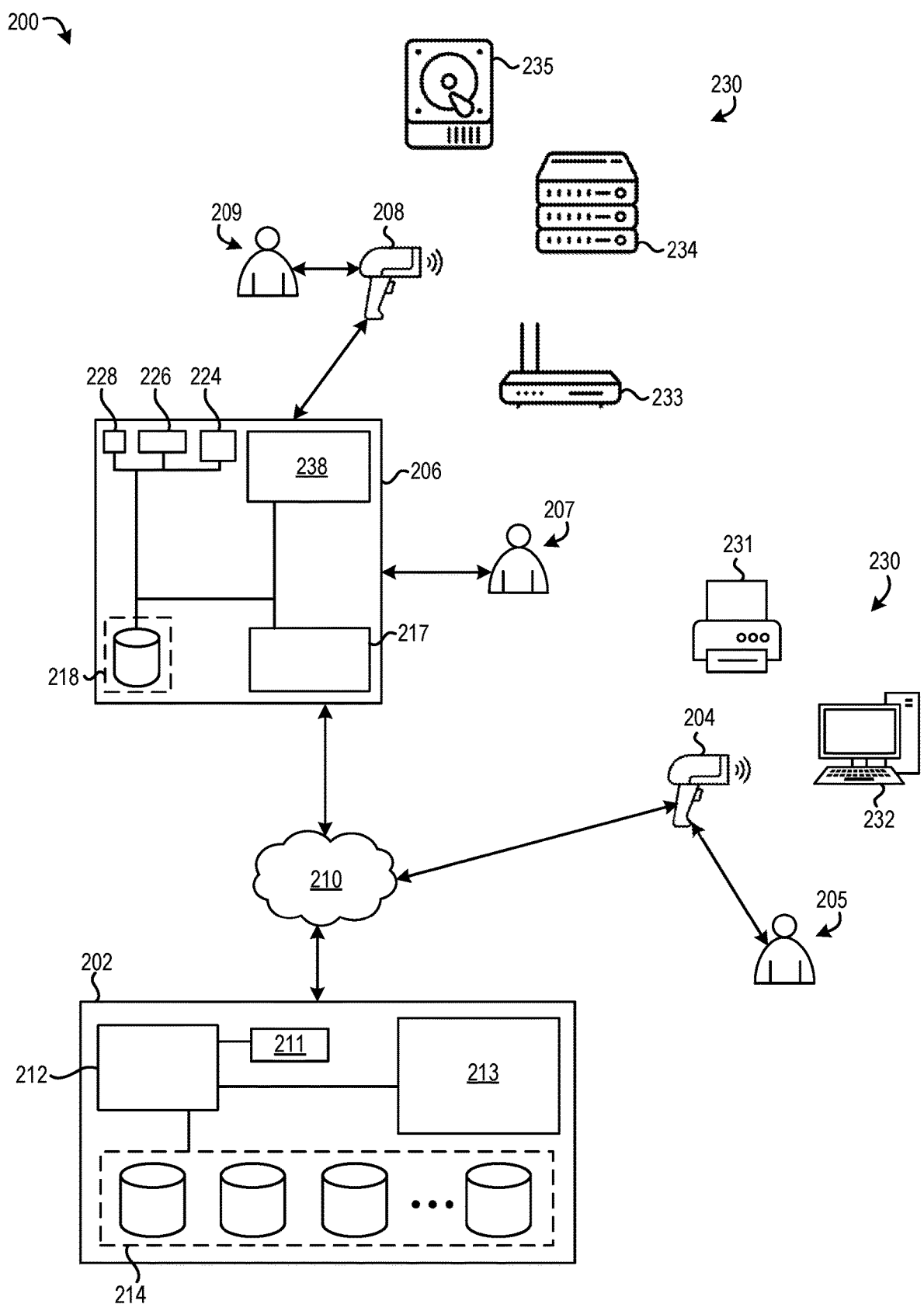
FIG. 2 is a representational view of a distributed system, in accordance with one approach.

Looking now to FIG. 2, a distributed system 200 having a distributed architecture is illustrated in accordance with one approach. As an option, the present system 200 may be implemented in conjunction with features from any other approach listed herein, such as those described with reference to the other FIGS., such as FIG. 1. However, such system 200 and others presented herein may be used in various applications and/or in permutations which may or may not be specifically described in the illustrative approaches or implementations listed herein. Further, the system 200 presented herein may be used in any desired environment. Thus FIG. 2 (and the other FIGS.) may be deemed to include any possible permutation.

As shown, the distributed system 200 includes a central server 202 that is connected over network 210 to an edge node 206 as well as a remote scanning device 204. The remote scanning device 204 is further accessible to a user 205, while the edge node 206 is assessable to administrator (e.g., developer) 207. The edge node 206 is further connected to a scanning device 208 that is accessible to (e.g., operated by) user 209. The remote scanning device 204, the edge node 206, and/or the scanning device 208 may thereby be considered "client devices," each of which are directly and/or indirectly connected to the central server 202. In some approaches, the remote scanning device 204 and/or scanning device 208 are mobile (e.g., handheld) scanning devices. In some approaches, the remote scanning device 204 and/or scanning device 208 are mobile phones running one or more applications configured to cause the mobile phones to function as respective scanning devices.

As noted above, the central server 202, remote scanning device 204, and edge node 206 are each connected to network 210, and may thereby be positioned in different geographical locations. The network 210 may be of any type, e.g., depending on the desired approach. For instance, in some approaches the network 210 is a WAN, e.g., such as the Internet. However, an illustrative list of other network types which network 210 may implement includes, but is not limited to, a LAN, a PSTN, a SAN, an internal telephone network, etc. As a result, any desired information, data, commands, instructions, responses, requests, etc. may be sent between central server 202, remote scanning device 204, edge node 206, and/or scanning device 208, regardless of the amount of separation which exists therebetween, e.g., despite being positioned at different geographical locations. According to some approaches, at least some of the locations connected to network 210 correspond to a different remote cloud server that is connected to (e.g., may be accessed by) remote scanning device 204 and/or edge node 206.

It should also be noted that two or more of the central server 202, remote scanning device 204, edge node 206, and scanning device 208 may be connected differently depending on the approach. According to an example, which is in no way intended to limit the invention, two servers (e.g., nodes) may be located relatively close to each other and connected by a wired connection, e.g., a cable, a fiber-optic link, a wire, etc.; etc., or any other type of connection which would be apparent to one skilled in the art after reading the present description.

The terms "user" and "developer" are in no way intended to be limiting. For instance, while users and developers may be described as being individuals in various implementations herein, a user and/or a developer may be an application, an organization, a preset process, etc. in other approaches. The use of "code," "data," and "information" herein are in no way intended to be limiting either, and may include any desired type of details, e.g., depending on the type of operating system implemented on the remote scanning device 204, edge node 206, central server 202, and/or scanning device 208.

With continued reference to FIG. 2, the remote scanning device 204 and scanning device 208 are used in the process of generating unique equipment codes for various network based devices 230. For instance, user 205 may interact with (e.g., operate) the remote scanning device 204 while generating unique equipment codes for printer 231 and/or computer 232. Similarly, user 209 may operate the scanning device 208 by manipulating one or more physical and/or logical buttons on the scanning device 208 in the process of generating unique equipment codes for router 233, server rack 234, and/or drive 235.

Although not shown in detail, remote scanning device 204 and/or scanning device 208 may include various components that allow the scanning devices to achieve an intended function and operate as desired. For example, remote scanning device 204 and/or scanning device 208 may include one or more sensors (e.g., global positioning system (GPS) sensors), processors, emitters, altimeters, barometers, AI based models and/or sub-systems, universal product code (UPC) scanning devices, displays, etc., that allow the scanning devices 204, 208 to identify the network based devices 230 and extract identifying characteristics from each respective device. With respect to the present description, it should be noted that "identifying characteristics" as used herein is intended to refer to any discernable traits (e.g., attributes) that may be used to describe the unique state (e.g., position, operating setting, movement, etc.,) of a given device. For example, identifying characteristics may include, but are in no way limited to, GPS information, cellular network information, WiFi network information, barcode information, direct reference in public records, etc. It follows that in some approaches the remote scanning device 204 and/or scanning device 208 include AI based modules that are configured to implement AI based visual recognition models that have been trained to extract identifying characteristics from the one or more images of the device. These AI based visual recognition models may thereby be used to evaluate images captured by one or more cameras in the scanning devices 204, 208.

As noted above, at least some processing occurs at remote scanning device 204 and/or scanning device 208. Again, the scanning devices may include AI based modules that are configured to implement AI based visual recognition models that have been trained to extract identifying characteristics from the one or more images of a device. However, information is also transmitted back to the edge node 206 and/or central server 202 for further processing.

Looking to central server 202, a large (e.g., robust) processor 212 is coupled to a cache 211, an AI module 213, and a data storage array 214 having a relatively high storage capacity. The AI module 213 may include any desired number and/or type of AI based models, e.g., such as machine learning models, deep learning models, neural networks, etc. In preferred approaches, the AI module 213 includes models that have been trained to assist in extracting identifying characteristics from a device and/or evaluate the identifying characteristics in order to generate unique equipment codes. In some approaches, the AI module 213 may work along with processor 212 to maintain an updated inventory of various equipment codes that are currently assigned to devices. AI module 213 and processor 212 may be configured to monitor changes in characteristics of the various devices, and identify situations where unique equipment codes should be updated to more accurately reflect the current states of the corresponding devices. AI module 213 and/or processor 212 may also be configured to perform one or more of the operations in method 300 of FIG. 3A, e.g., as will be described in further detail below.

With continued reference to FIG. 2, edge node 206 includes a controller 217 which is coupled to memory 218. The controller 217 receives inputs from and interfaces with administrator 207 and/or scanning device 208. For instance, information (e.g., including identifying characteristics) extracted by scanning device 208 from one or more devices 230 may be sent from scanning device 208 back to edge node 206. In other approaches, the administrator 207 may input information using one or more of: a display screen 224, keys of a computer keyboard 226, and a computer mouse 228. The controller 217 may thereby be configured to receive inputs from any of these components as entered by the administrator 207. These inputs typically correspond to information presented on the display screen 224 while the entries were received. Moreover, the inputs received from the keyboard 226 and computer mouse 228 may impact the information shown on display screen 224, data stored in memory 218, status of an operating system being implemented by controller 217, etc.

Additionally, the controller 217 is coupled to an AI module 238. As described above with respect to AI module 213, the AI module 238 may include any desired number and/or type of AI based models, e.g., such as machine learning models, deep learning models, neural networks, etc. However, in preferred approaches the AI module 238 includes models that have been trained to assist in extracting identifying characteristics from a device and/or evaluate the identifying characteristics in order to generate unique equipment codes. In some approaches, the AI module 238 may work along with controller 217 to maintain an updated inventory of various equipment codes that are currently assigned to devices. AI module 238 and controller 217 may be configured to monitor changes in characteristics of the various devices, and identify situations where unique equipment codes should be updated to more accurately reflect the current states of the corresponding devices. AI module 238 and/or controller 217 may also be configured to perform one or more of the operations in method 300 of FIG. 3A, e.g., as will be described in further detail below.

In some approaches, data (e.g., identifying characteristics), requests, commands, etc., may be submitted by user 205 via remote scanning device 204 to central server 202, may be submitted by administrator 207 to edge node 206, and/or may be submitted by user 209 via scanning device 208 to edge node 206. For instance, sensor data captured by one or more components in remote scanning device 204 may be received for evaluation at central server 202. The sensor data may include identifying characteristics that may be used to generate the unique equipment codes using one or more applications, software programs, temporary communication connections, etc., that may be running at central server 202.

Figure 3A:
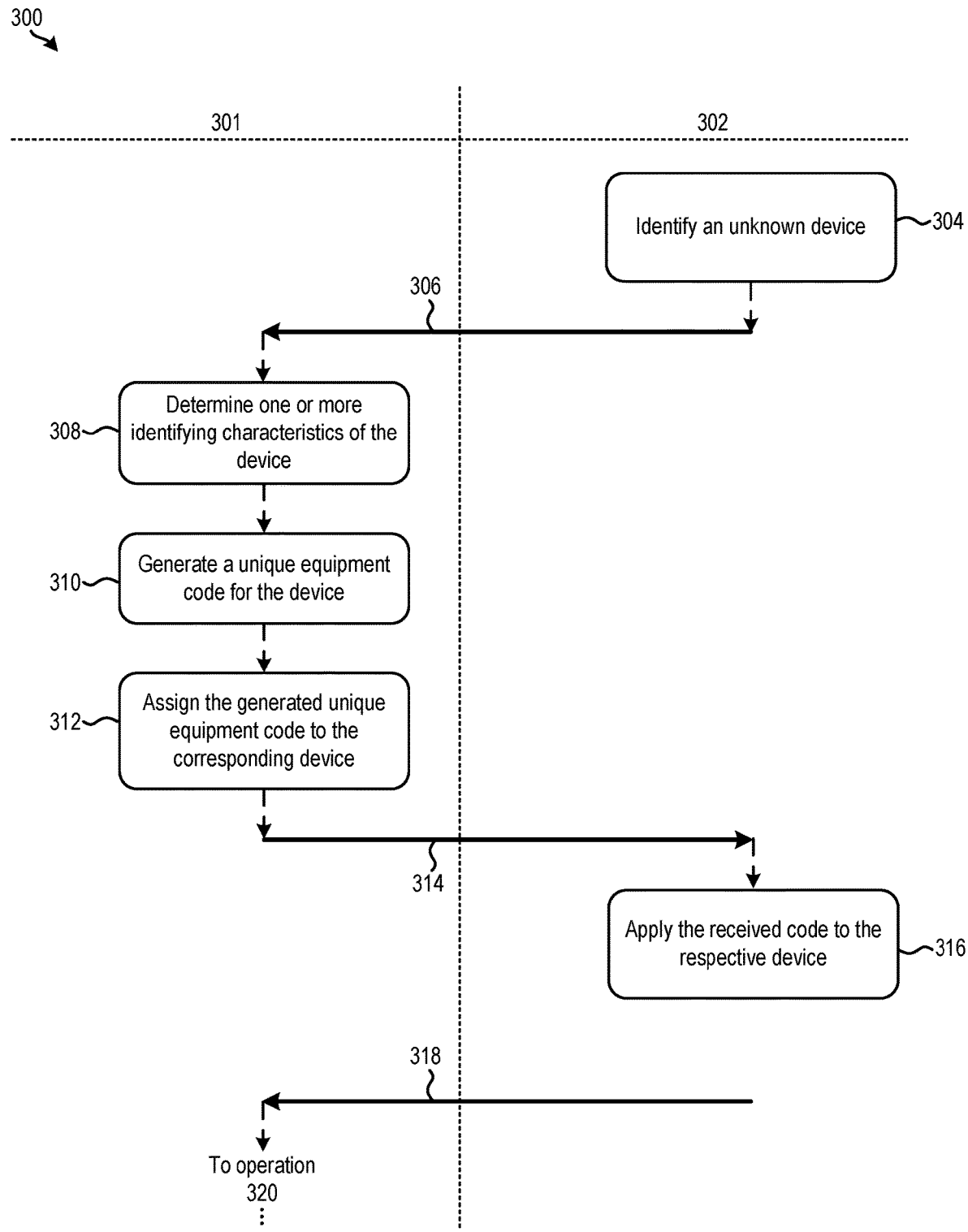
FIG. 3A is a flowchart of a method, in accordance with one approach.
Figure 3A:
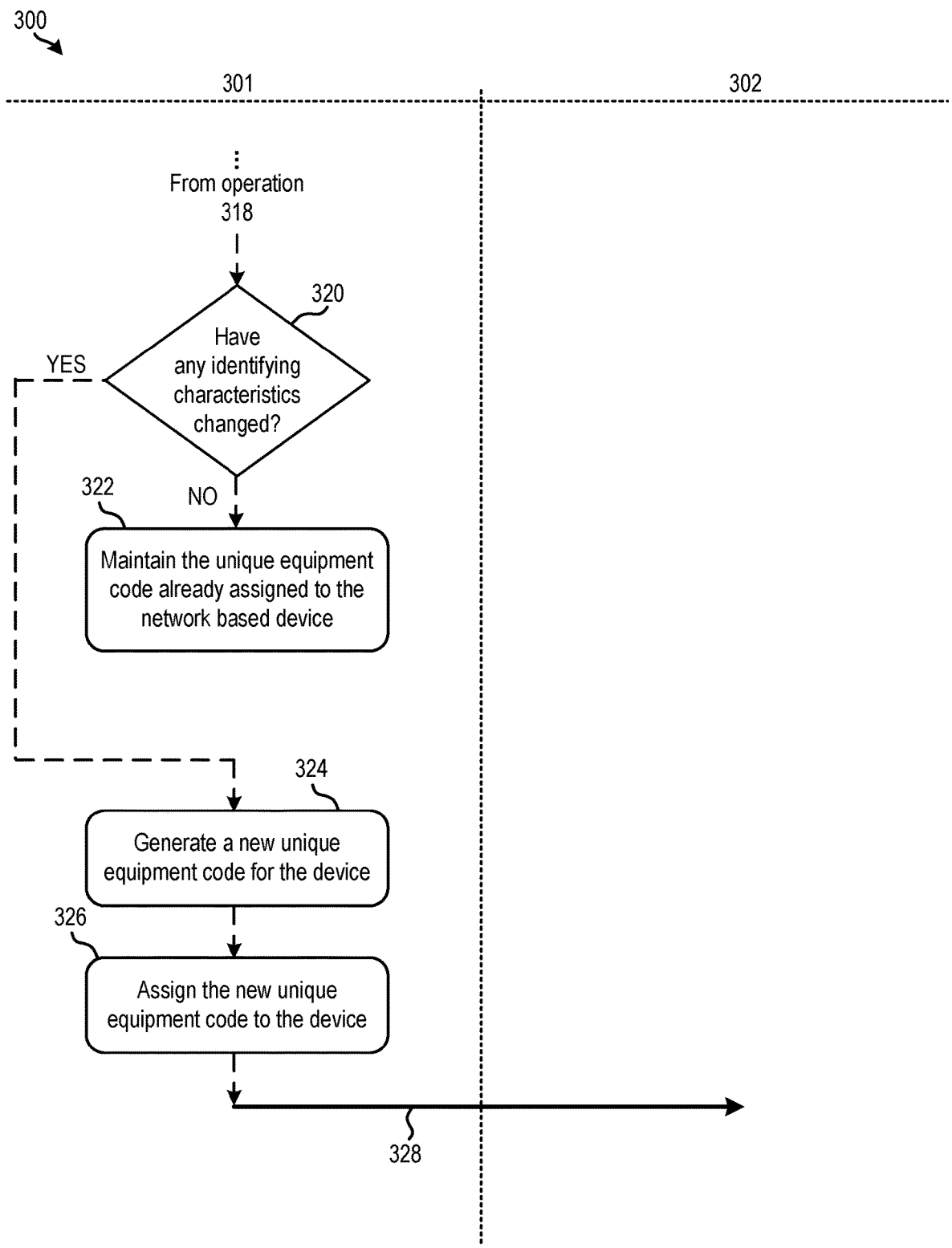

Looking now to FIG. 3A, a flowchart of a computer-implemented method 300 for generating unique equipment codes is illustrated in accordance with one approach. The operations in method 300 are able to track identifying characteristics of different devices, and use those identifying characteristics to generate the unique equipment codes. The method 300 may be performed in accordance with the present invention in any of the environments depicted in FIGS. 1-2, among others, in various approaches. Of course, more or less operations than those specifically described in FIG. 3A may be included in method 300, as would be understood by one of skill in the art upon reading the present descriptions. Each of the steps of the method 300 may further be performed by any suitable component of the operating environment. For example, the nodes 301, 302 shown in the flowchart of method 300 may correspond to one or more processors positioned at a different location in a distributed system. Moreover, each of the one or more processors are preferably configured to communicate with each other.

In various approaches, the method 300 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 300. Illustrative processors include, but are not limited to, a central processing unit (CPU), an application specific integrated circuit (ASIC), a field programmable gate array (FPGA), etc., combinations thereof, or any other suitable computing device known in the art.

As mentioned above, FIG. 3A includes different nodes 301, 302, each of which represent one or more processors, controllers, computer, etc., positioned at a different location in a distributed system. Node 301 may include one or more processors which are located in a central server of a distributed system (e.g., see processor 212 of FIG. 2 above). In another approach, node 301 may include one or more processors which are located at an edge node that is connected to a network in a distributed system (e.g., see controller 217 of FIG. 2 above). Moreover, node 302 may include one or more processors which are located at a scanning device of a distributed system (e.g., see remote scanning device 204 and/or scanning device 208 of FIG. 2 above). Accordingly, commands, code, data, metadata outlining identifying characteristics, etc. may be sent between the nodes 301, 302 depending on the approach. It should also be noted that the various processes included in method 300 are in no way intended to be limiting, e.g., as would be appreciated by one skilled in the art after reading the present description. For instance, data sent from node 302 to node 301 may be prefaced by a request sent from node 301 to node 302 in some approaches.

As shown, operation 304 is performed at node 302 and initiates the process of generating a unique code for an identified device. It follows that operation 304 may be performed in response to receiving a command, identifying a new device in a known environment (e.g., using AI based visual recognition models), etc. There, operation 304 includes identifying an unknown device. With respect to the present description, an "unknown" device may include any device that cannot be referenced specifically (e.g., easily accessed). For example, any device for which there are no known identifying characteristics, or a number of identifying characteristics below a predetermined range, may be classified as an unknown device. In other approaches, devices for which a unique equipment code has not yet been generated may be designated as unknown devices.

The scanning device at node 302 may identify the unknown device while examining the surrounding environment. For example, the scanning device may include one or more cameras that are configured to capture images of their surrounding environment, as well as one or more AI based models that are trained to analyze the images (e.g., pixels in the images) to determine the presence of devices. In response to identifying a device in an image, the scanning device may use information known about the device to determine whether it has been previously identified and processed. As mentioned above, it may be desirable that environments (e.g., locations) may continue to be inspected for newly added devices, in addition to identifying situations where devices have been removed or otherwise changed from a previous configuration. The one or more AI based models may thereby be used to perform reoccurring inspections for devices in some approaches.

In response to identifying the unknown device at node 302, method 300 advances to operation 306. There, a request to generate a unique equipment code identifying the unknown device originates at node 302, and is sent to node 301. In response to receiving the request at node 301, method 300 advances to operation 308. There, operation 308 includes examining the request and determining one or more identifying characteristics of the device. As noted above, an identifying characteristic may include any discernable trait(s) that may be used to describe the unique state (e.g., position, operating setting, motion, etc.,) of a given device. It follows that identifying characteristics may include, but are in no way limited to, GPS information, cellular network information, WiFi network information, barcode information, direct reference in public records, etc.

For instance, in some approaches operation 308 includes determining identifying characteristics of the device by extracting GPS information received along with the request in operation 306. The GPS information may thereby have been collected by a scanning device at node 302, e.g., as a part of generating the request ultimately sent to node 301 in operation 306. GPS information may include GPS coordinates that describe the precise location (e.g., state, city, details of a building in which the device is located, etc.) of the device. In other approaches operation 308 includes extracting cellular network information from the request received in operation 306. For example, in situations where a scanning device at node 301 is configured to send/receive cellular signal, it may triangulate a precise location of the device based on signals received from cellular towers. For example, the scanning device may use the relative signal strength from three different cellular towers nearby to triangulate device location with a high degree of accuracy.

In other approaches operation 308 includes extracting WiFi network information from the request received in operation 306. For example, a scanning device at node 302 may be configured to use a location services databases in conjunction with Service Set IDentifier (SSID) of the cellular network and the location of the access point to determine the location details of the device. In still other approaches, operation 308 includes extracting identifying characteristics from publicly available documents, e.g., such as building blueprints. Using building blueprints and other plans may allow for a scanning device at node 302 to triangulate the precise location of a device, e.g., using WiFi signal strength on a particular building floor.

In other approaches, operation 308 includes scanning a barcode and/or quick-response (QR) code. In other approaches, operation 308 includes using other visual recognition models to identify new or changed devices. For example, one or more AI based models that have been trained on images of common devices for a particular client may be used to extract identifying characteristics from one or more unknown devices. In still other approaches, additional sources can be used, e.g., such as inferring identifying characteristics based on known unique codes of nearby devices.

According to an in-use example, which is in no way intended to limit the invention, a scanning device at node 302 may include GPS receivers and geolocation services to determine the height and floor details of a building in which an unknown device is located. In some approaches, this may provide vertical positioning based on a "Height Above Ellipsoid" metric, e.g., as would be appreciated by one skilled in the art after reading the present description. This desirably gives an estimate of the height of a building from the earth's position based on a position of the calculated value of earth's ellipsoid. Other geospatial tools are also able to provide the actual deviation of the earth surface from the ellipsoid, which allows the height above terrain to be calculated. Barometers on the scanning device may also be used to provide an estimation of the height of a device by measuring pressure differences. Scanning devices may also include altimeters to measure height of a device. Accordingly, the different sources of height information may be combined to create a more accurate identifying characteristics of an unknown device.

While each of the identifying characteristics are preferably received or extractable from provided information, certain identifying characteristics may be unknown in some situations. For example, information may be limited or lost in transit between node 302 and 301. Thus, in situations where a desired identifying characteristic is unknown and inaccessible, past values of the desired identifying characteristic may be used. Extracted identifying characteristics may thereby be stored in memory for at least a predetermined amount of time.

In some approaches, the scanning device is able to store and recall past identifying characteristics and use them to make future recognitions, e.g., based on memory. According to an example, a scanning device used outside a building may register the GPS location from the signals outside the building to corresponding city, state, and building codes. Thus, even in situations where the scanning device loses the GPS signal when inside the building, it is able to recall and reuse the city, state and building codes generated using the GPS location outside the building, e.g., unless overridden by another value that may be entered by an operator (e.g., user). According to another example, while scanning items on racks at a network data center in a building, one or more AI models detect the rack number and/or shelf number from images taken of the rack and/or shelf by a camera on the scanning device. Once the rack and shelf are scanned and recognized, the value is remembered for subsequent use, e.g., until a different rack and/or shelf are detected.

This process may not only be applied during the first install of a device in a system, but can also be applied periodically to audit the devices that are in a system. As noted above, this allows approaches herein to ensure the unique equipment codes reflect the current status (e.g., state) of the device. This process can be automated with the scanning device mounted on an automated robot that physically visits a number of locations having devices, e.g., Server and Communication rooms, Data Centers, etc., of a service provider. Accordingly, the robot may be configured to use a scanning device to scan the devices, and in situations where it is detected that one or more devices have been moved, but the corresponding equipment codes have not yet been updated, an updated equipment code that reflects the current state of the device is generated and used to update all operational systems. This desirably increases the accuracy and operational efficiency of managing, monitoring, and providing accurate field services for these devices.

Referring still to FIG. 3A, method 300 advances from operation 308 to operation 310. There, operation 310 includes generating a unique equipment code for the identified device. While the process of generating a unique equipment code may vary depending on the particular approach, preferred approaches reference policy based rules that have been summarized in one or more information dependency graphs. In other words, the information dependency graphs may be developed such that they reflect policy based rules that outline how identifying characteristics are combined to create a unique equipment code.

Figure 3B:
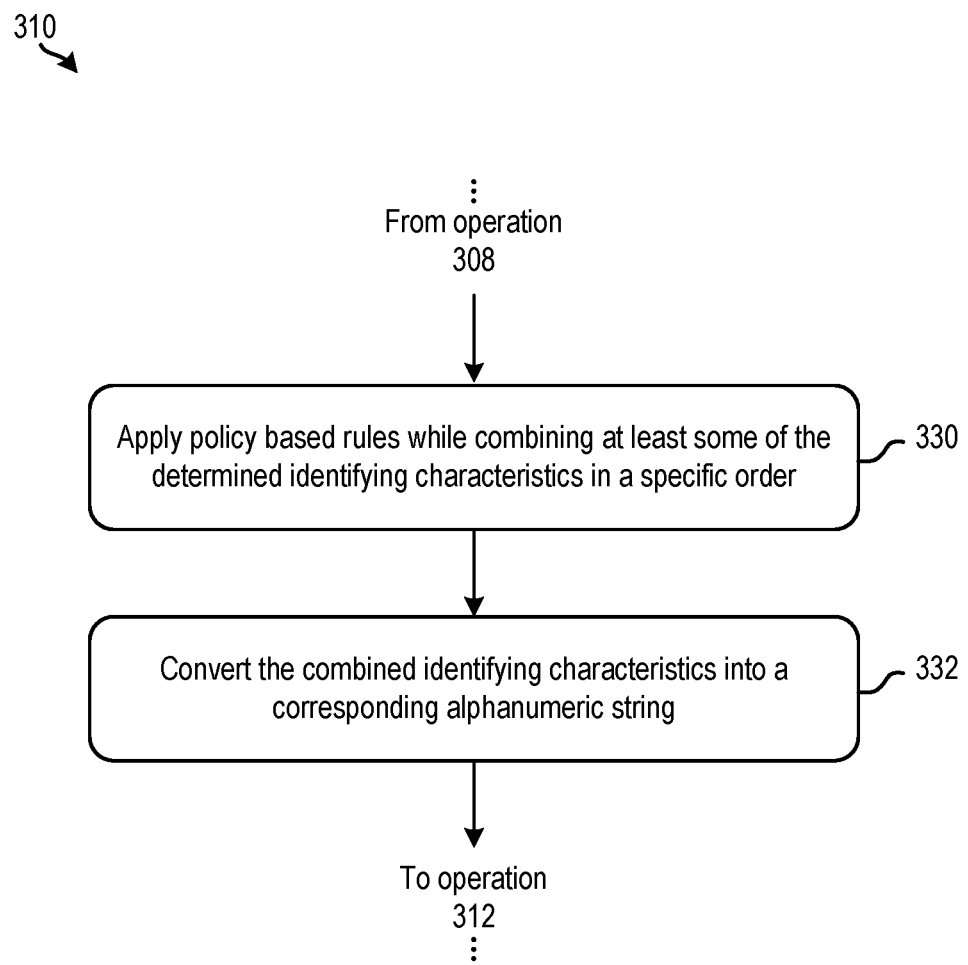
FIG. 3B is a flowchart of sub-operations that may be performed in association with one of the operations in the method of FIG. 3A, in accordance with one approach.

Looking briefly to FIG. 3B, exemplary sub-operations of generating a unique equipment code for an identified unknown device are illustrated in accordance with one approach. It follows that one or more of these sub-operations may be used to perform operation 310 of FIG. 3A. However, it should be noted that the sub-operations of FIG. 3B are illustrated in accordance with one approach which is in no way intended to be limiting.

Figure 4:
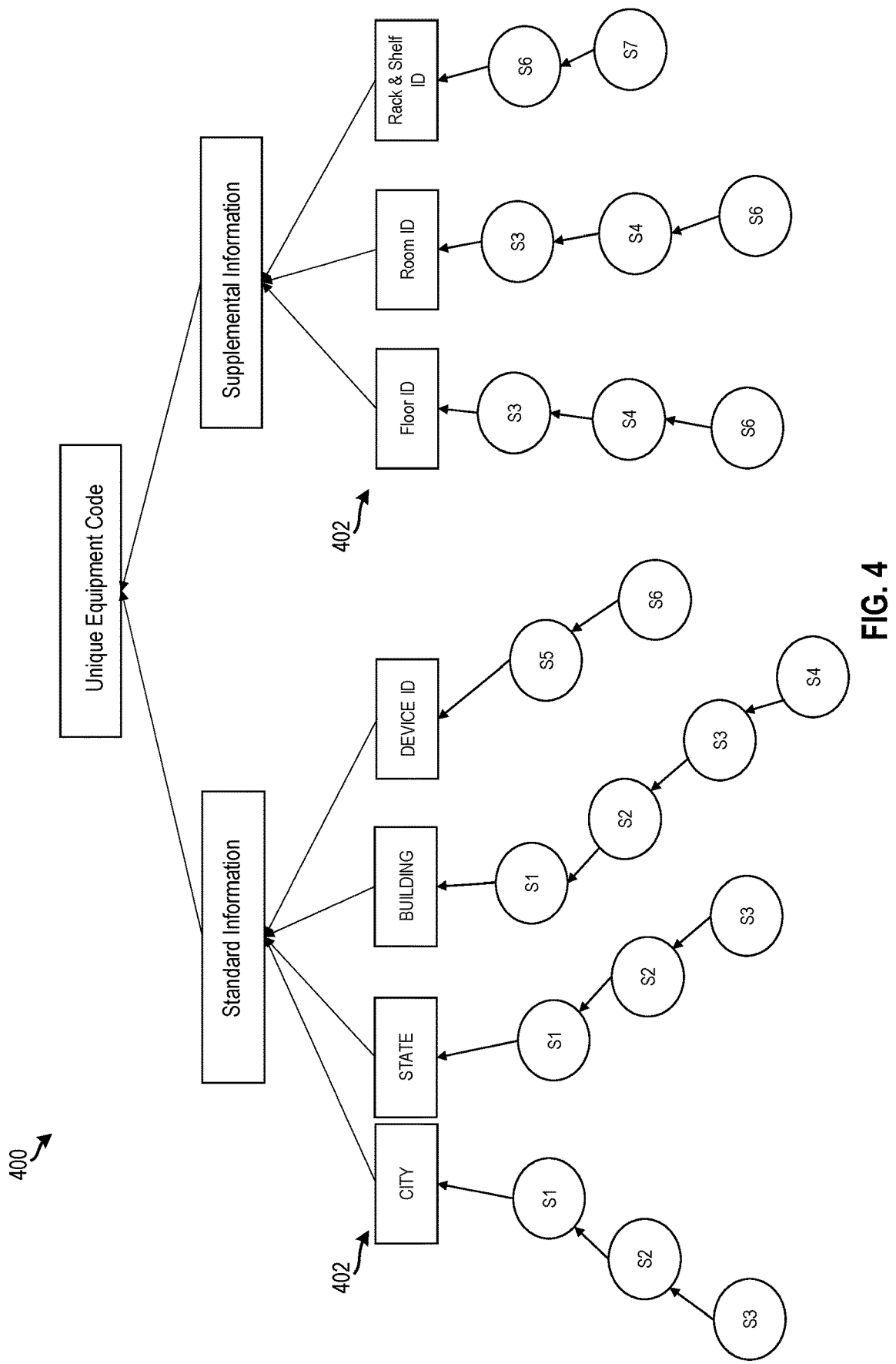
FIG. 4 is a representational view of a dependency graph, in accordance with an in-use example.

As shown, sub-operation 330 includes applying policy based rules while combining at least some of the determined identifying characteristics in a specific order. These policy based rules are further summarized in one or more predetermined information dependency graphs. In other words, sub-operation 330 includes referencing one or more information dependency graphs to determine which identifying characteristics should be combined, and in what order, to generate the unique equipment code. According to an example, which is in no way intended to be limiting, FIG. 4 illustrates a dependency graph that organizes various identifying characteristics in accordance with an in-use example. However, information dependency graphs may be converted into different forms and/or formats depending on available identifying characteristics.

Proceeding from sub-operation 330 to sub-operation 332, there the combined identifying characteristics are converted into a corresponding alphanumeric string. In other words, the specific combination of identifying characteristics produced in sub-operation 330 are used to form a corresponding alphanumeric string. In some approaches the alphanumeric string is formed by performing a translation of the combined identifying characteristics. For example, the combined identifying characteristics may be abbreviated, converted into a different format, translated into a different language (e.g., programming language), etc. In other approaches, converting the combined identifying characteristics includes translating the characteristics and encrypting the translated characteristics. In still other approaches, converting the combined identifying characteristics includes translating the characteristics and compressing the translated characteristics.

Returning now to FIG. 3A, method 300 advances from operation 310 to operation 312. There, operation 312 includes assigning the unique equipment code generated in operation 310 to the corresponding device. In some approaches, the unique equipment code is assigned by being stored in a lookup table along with the corresponding device. In other approaches, the device and unique equipment code may be added to a pool of known devices that are monitored for accuracy over time, e.g., as described in further detail below.

From operation 312, method 300 advances to operation 314. There, operation 314 includes transmitting the unique equipment code from node 301 back to the remote location at node 302. In response to receiving the unique equipment code at node 302, operation 316 includes applying the received code to the respective device. As noted above, in some approaches this may be accomplished by updating a lookup table maintained in memory of a scanning device at node 302. In other approaches, an update may be sent to a central repository that maintains the relationships between various devices and the unique equipment codes that have been generated and are currently active.

As noted above, it is desirable that devices are monitored even after they have been identified with an equipment code. Thus, as devices change over time (e.g., are moved, change configurations, update software, etc.), the equipment codes are also preferably updated to reflect the current state of the devices. This desirably increases the accuracy and operational efficiency of managing, monitoring, and providing accurate field services for these devices. Accordingly, FIG. 3A also includes node 301 periodically receiving requests to audit the unique equipment codes that have been assigned to devices. For instance, operation 318 includes receiving a request from node 302 to audit the unique equipment code assigned to a given network based device.

In response to receiving the request at node 301, operation 320 includes determining whether any of the identifying characteristics associated with the identified device have changed since the existing equipment code was generated. In some approaches operation 320 includes inspecting a lookup table and comparing entries therein to new identifying characteristics received along with the request in operation 318. In other approaches, operation 320 includes extracting new identifying characteristics and comparing them to those used to generate the existing equipment codes.

In response to determining that none of the identifying characteristics associated with the device have been updated, method 300 advances from operation 320 to operation 322. There, operation 322 includes simply maintaining the unique equipment code already assigned to the network based device. However, method 300 advances from operation 320 to operation 324 in response to determining that one or more of the identifying characteristics associated with the device have changed. There, operation 324 includes generating a new unique equipment code for the device. It follows that operation 324 may implement any one or more of the approaches described above with respect to performing operation 310. Moreover, operation 326 includes assigning the new unique equipment code to the device, while operation 328 includes transmitting the new unique equipment code back to the remote location at node 302 for implementation.

It follows that method 300 is desirably able to automatically generate unique equipment codes for network devices by referencing information dependency graphs. Thus, approaches herein are able to track identifying characteristics of different (network based) devices such that they may be more easily and closely tracked. The relationships between the various devices may also be managed using the dependency graphs that can be accessed while generating new equipment codes and/or reviewing existing equipment codes to identify changes over time.

Looking now to FIG. 4, a dependency graph 400 is shown in accordance with an in-use example which is in no way intended to be limiting. As shown, a number of data sources that produce identifying characteristics S1, S2, S3, S4, S5, S6, S7 are grouped into subsets that correspond to a respective field 402. Each subset of identifying characteristics is also organized in a hierarchical order, e.g., such that identifying characteristics closer to the fields 402 have a lower priority than identifying characteristics farther away.

Thus, depending on the types of identifying characteristics that are available for a given device, the dependency graph 400 outlines which characteristics are given priority over others in determining the unique equipment code that is ultimately generated for the device. Moreover, depending on what identifying characteristics are available, a number are combined in a desired order to form the Standard Information as well as the Supplemental Information. The Standard Information and Supplemental Information are further combined to create a Unique Equipment Code for the device corresponding to the identifying characteristics.

For example, the City field is determined by sources s1, s2, and s3, with priority constraints of s3 being more important than s2, being more important than s1. The State field is determined by sources s1, s2, and s3, with priority constraints of s3 being more important than s2, being more important than s1. The Building field is determined by sources s1, s2, s3, and s4 with priority constraints of s4 being more important than s3, being more important than s2, being more important than s1. The Device Id field is determined by sources s5, and s6 with priority constraint of s5 being more important than s6. The Floor Id field is determined by sources s3, s4, and s6 with priority constraint of s4 more important than s3, more important than s6. The Room Id field is determined by sources s3, s4, and s6 with priority constraint of s4 more important than s3, more important than s6. The Rack & Shelf Id field is determined by sources s6 and s7, with priority of s6 over s7. It follows that each field is obtained by following the inverse link to the data source node, which may or may not be able to provide the information. Each identifying characteristic is thereby determined by continuing to traverse up each arm of the dependency graph 400, and populate the field based on the last known value from each node. This scheme is specific and allows for codes to be processed in a number of different formats. For different scenarios, different dependency graphs can be determined to account for the different types of fields and/or types of sources that are available.

In addition to approaches herein implementing mobile (e.g., handheld) scanning devices that are able assist in collecting identifying characteristics of various devices, some approaches may be implemented as a software component that is embedded within the control processor of a telecommunications device. In such approaches, dependency graph information may be obtained from neighboring (e.g., physically nearby) devices. For example, by comparing the location field (e.g., room in a building) of a device with the locations of other co-located equipment (e.g., equipment that is in the same network segment, in the same rack, connected to the same top of rack switch(s), etc.), the software component may be able to automatically determine (e.g., using a policy) that all neighboring devices should be in the same room. Moreover, by detecting that fields (e.g., strengths of wireless connections between the devices) change from these assumptions, it may be inferred that the device has moved or otherwise changed, and due for an updated equipment code to reflect these changes, e.g., as described herein.

In other approaches, one or more software components may be used to track telecommunications equipment implemented as a containerized network function or a virtual network function. The software components may be tracked using code that incorporates desired information dependency graphs as a library within the implementation, thereby allowing for the identification of attributes. In response to assigning the software, it may automatically generate an equipment code from the spawning process, computes its own equipment code using a new source field (e.g., using the software process ID and/or component ID), and updates corresponding information in the registry. This would allow implementations of network systems in 5G or 6G networks to look and feel like hardware implementations and allow them to interoperate seamlessly with legacy management systems, e.g., as would be appreciated by one skilled in the art after reading the present description.

It will be clear that the various features of the foregoing systems and/or methodologies may be combined in any way, creating a plurality of combinations from the descriptions presented above.

It will be further appreciated that implementations of the present invention may be provided in the form of a service deployed on behalf of a customer to offer service on demand.

The descriptions of the various implementations of the present invention have been presented for purposes of illustration, but are not intended to be exhaustive or limited to the implementations disclosed. Many modifications and variations will be apparent to those of ordinary skill in the art without departing from the scope and spirit of the described implementations. The terminology used herein was chosen to best explain the principles of the implementations, the practical application or technical improvement over technologies found in the marketplace, or to enable others of ordinary skill in the art to understand the implementations disclosed herein.

What is claimed is:

1. A computer-implemented method (CIM), comprising:
receiving, from a remote location, a request to generate a unique equipment code identifying a device;
determining identifying characteristics of the device;
generating the unique equipment code by:
applying policy based rules summarized in one or more predetermined information dependency graphs while combining at least some of the determined identifying characteristics in a specific order, and
converting the combined identifying characteristics into a corresponding alphanumeric string;
assigning the unique equipment code to the device; and
transmitting the unique equipment code to the remote location.

2. The CIM of claim 1, wherein the request is received from a mobile scanning device, wherein the device is a network based device.

3. The CIM of claim 2, wherein the mobile scanning device includes one or more components selected from the group consisting of: global positioning system (GPS) sensors, altimeters, barometers, AI based models and/or subsystems, and universal product code (UPC) scanners, wherein each of the one or more components are configured to collect a respective one of the identifying characteristics.

4. The CIM of claim 2, wherein the mobile scanning device includes a camera configured to capture one or more images of the device, wherein the mobile scanning device is configured to implement one or more artificial intelligence based visual recognition models trained to extract identifying characteristics from the one or more images of the device.

5. The CIM of claim 1, wherein the identifying characteristics of the device are selected from the group consisting of: global positioning system (GPS) information, cellular network information, WiFi network information, barcode information, and building permit information.

6. The CIM of claim 1, wherein the determining of the identifying characteristics of the device includes:
in response to determining a particular identifying characteristic is unknown for the device, reapplying a value of the particular identifying characteristic determined for a last device.

7. The CIM of claim 1, further comprising:
periodically receiving, from the remote location, requests to audit the unique equipment code assigned to the device;
in response to determining one or more of the identifying characteristics of the device have changed, generating a new unique equipment code by:
applying the policy based rules while combining new identifying characteristics in a specific order, and
converting the combined new identifying characteristics into a corresponding new alphanumeric string;
assigning the new unique equipment code to the device; and
transmitting the new unique equipment code to the remote location.

8. The CIM of claim 7, further comprising:
in response to determining the identifying characteristics of the device have not changed, maintaining the unique equipment code assigned to the device.

9. A computer program product (CPP), comprising:
a set of one or more computer-readable storage media; and
program instructions, collectively stored in the set of one or more storage media, for causing a processor set to perform the following computer operations:
receive, from a remote location, a request to generate a unique equipment code identifying a device;
determine identifying characteristics of the device;
generate the unique equipment code by:
applying policy based rules summarized in one or more predetermined information dependency graphs while combining at least some of the determined identifying characteristics in a specific order, and
converting the combined identifying characteristics into a corresponding alphanumeric string;
assign the unique equipment code to the device; and
transmit the unique equipment code to the remote location.

10. The CPP of claim 9, wherein the request is received from a mobile scanning device, wherein the device is a network based device.

11. The CPP of claim 10, wherein the mobile scanning device includes one or more components selected from the group consisting of: global positioning system (GPS) sensors, altimeters, barometers, AI based models and/or subsystems, and universal product code (UPC) scanners, wherein each of the one or more components are configured to collect a respective one of the identifying characteristics.

12. The CPP of claim 10, wherein the mobile scanning device includes a camera configured to capture one or more images of the device, wherein the mobile scanning device is configured to implement one or more artificial intelligence based visual recognition models trained to extract identifying characteristics from the one or more images of the device.

13. The CPP of claim 9, wherein the identifying characteristics of the device are selected from the group consisting of: global positioning system (GPS) information, cellular network information, WiFi network information, barcode information, and building permit information.

14. The CPP of claim 9, wherein the determining of the identifying characteristics of the device includes:
in response to determining a particular identifying characteristic is unknown for the device, reapplying a value of the particular identifying characteristic determined for a last device.

15. The CPP of claim 9, wherein the program instructions are for causing the processor set to further perform the following computer operations:
periodically receive, from the remote location, requests to audit the unique equipment code assigned to the device;
in response to determining one or more of the identifying characteristics of the device have changed, generate a new unique equipment code by:
applying the policy based rules while combining new identifying characteristics in a specific order, and
converting the combined new identifying characteristics into a corresponding new alphanumeric string;
assign the new unique equipment code to the device; and
transmit the new unique equipment code to the remote location.

16. The CPP of claim 15, wherein the program instructions are for causing the processor set to further perform the following computer operations:
in response to determining the identifying characteristics of the device have not changed, maintain the unique equipment code assigned to the device.

17. A computer system (CS), comprising:
a processor set;
a set of one or more computer-readable storage media;
program instructions, collectively stored in the set of one or more storage media, for causing the processor set to perform the following computer operations:
receive, from a remote location, a request to generate a unique equipment code identifying a network based device;
determine identifying characteristics of the network based device;
generate the unique equipment code by:
applying policy based rules summarized in one or more predetermined information dependency graphs while combining at least some of the determined identifying characteristics in a specific order, and
converting the combined identifying characteristics into a corresponding alphanumeric string;
assign the unique equipment code to the network based device; and
transmit the unique equipment code to the remote location.

18. The CS of claim 17, wherein the request is received from a mobile scanning device, wherein the mobile scanning device includes one or more components selected from the group consisting of: global positioning system (GPS) sensors, altimeters, barometers, AI based models and/or subsystems, and universal product code (UPC) scanners, wherein each of the one or more components are configured to collect a respective one of the identifying characteristics.

19. The CS of claim 18, wherein the mobile scanning device includes a camera configured to capture one or more images of the device, wherein the mobile scanning device is configured to implement one or more artificial intelligence based visual recognition models trained to extract identifying characteristics from the one or more images of the device.

20. The CS of claim 17, wherein the program instructions are for causing the processor set to further perform the following computer operations:
periodically receive, from the remote location, requests to audit the unique equipment code assigned to the device;
in response to determining one or more of the identifying characteristics of the device have changed, generate a new unique equipment code by:

applying the policy based rules while combining new identifying characteristics in a specific order, and converting the combined new identifying characteristics into a corresponding new alphanumeric string;
assign the new unique equipment code to the device; and
transmit the new unique equipment code to the remote location.

* * * * *